United States Patent
Minevski et al.

(12) 
(10) Patent No.: US 6,187,227 B1
(45) Date of Patent: *Feb. 13, 2001

(54) THIACROWN ETHER COMPOUND CORROSION INHIBITORS FOR ALKANOLAMINE UNITS

(75) Inventors: Ljiljana V. Minevski, The Woodlands, TX (US); Janet A. Gaboury, Blue Bell, PA (US)

(73) Assignee: Betzdearborn, Trevose, PA (US)

( * ) Notice: Under 35 U.S.C. 154(b), the term of this patent shall be extended for 0 days.

This patent is subject to a terminal disclaimer.

(21) Appl. No.: 09/088,994

(22) Filed: Jun. 2, 1998

(51) Int. Cl.$^7$ .............................. C09K 3/00; C23F 11/00; C10G 29/00
(52) U.S. Cl. ........................ 252/390; 252/391; 252/395; 208/47; 208/207; 208/236; 422/7; 422/13
(58) Field of Search ................................... 252/391, 390, 252/395; 208/207, 236, 47; 422/7, 13; 549/9

(56) References Cited

U.S. PATENT DOCUMENTS

| | | | |
|---|---|---|---|
| 3,133,028 | 5/1964 | Kenhere | 252/389 |
| 3,856,813 | 12/1974 | Pederson et al. | 260/327 B |
| 4,100,100 | 7/1978 | Clouse et al. | 252/189 |
| 4,102,804 | 7/1978 | Clouse et al. | 252/189 |
| 4,431,563 | 2/1984 | Krawcyzk et al. | 252/189 |
| 4,446,119 | 5/1984 | Du Part et al. | 435/228 |
| 4,541,946 | 9/1985 | Jones et al. | 252/189 |
| 4,595,723 | 6/1986 | Henson et al. | 524/398 |
| 4,596,849 | 6/1986 | Henson et al. | 524/398 |
| 4,766,229 | 8/1988 | Kobayashi et al. | 556/138 |
| 4,882,449 * | 11/1989 | Harris | 568/325 |
| 5,049,201 * | 9/1991 | Cheng et al. | 252/396 |
| 5,071,581 | 12/1991 | Cipriano | 252/77 |
| 5,531,937 | 7/1996 | Minevski et al. | 252/394 |

FOREIGN PATENT DOCUMENTS

| | | | |
|---|---|---|---|
| 0407324 | 1/1991 | (EP) . | |
| 1287339 | 8/1972 | (GB) . | |
| 55-19221 | 2/1980 | (JP) . | |
| WO 96/27493 | 12/1996 | (WO) | C08G/73/06 |
| 99/10561 | 3/1999 | (WO) . | |

OTHER PUBLICATIONS

CAS 114:49235, 1991.*
Two English abstracts of JP 55–19221. Feb. 9, 1980.
Database WPI Section Ch, Week 96500, Derwent Publications Ltd., London, GB, Class E36, AN 96-504241, XP002113807.

Patent Abstracts of Japan, vol. 16, No. 194 (C–0938), May 1992. JP04029721.

"Syntheses and Chelating Propeerties of Polymer–Supported Macrocyclic Polythioethers", by Masao Tomoi, Osamu Abe, Nobutaka Takasu, Hiroshi Kakiuchi, *Makromol. Chem.* 184, p. 2431–2436 (1983) Month Unknown.

"Syntheses of thiacrown ethers polymers and their application for heavy metal ion adsorbents" by Keiji Yamashita, Kyouzou Kurita, Kazumine Ohara, Kazutoshi Tamura, Mamoru Nango, Kazuichi Tsuda, *Reactive & Functional Polymers* 31, p. 47–55 (1996) Month Unknown.

"Synthesis of macrocyclic sulfides using cesium thiolate: 1,4,8, 11–tetrathiacyclotetradecane" by J. Buter and Richard M. Kellog, *Organic Synthesis* vol. 65, p. 150–158 (1987) Month Unknown.

"Crystal and Molecular Structure of $NbCl_5)2(C_{10}H_{20}S_4)$. An adduct of $NbCl_5$ with an "Inside out" Bridging Macrocyclic Ligand", by Richard E. DeSimone and Milton D. Glick, *Journal of the American Chemical Society* 97:4, p. 942–943, Feb. 19, 1975.

* cited by examiner

*Primary Examiner*—Margaret Medley
(74) *Attorney, Agent, or Firm*—Greenblum & Bernstein P.L.C.

(57) ABSTRACT

The corrosion of metals in contact with aqueous alkanolamine solution in acid gas removal units is inhibited by adding to the alkanolamine solution a corrosion inhibiting amount of a thiacrown ether compound. The compounds are monomeric or polymeric and have from 4 to about 10 sulfur atoms on each of the crown rings. The polymeric thiacrown ether ring structures are substituted with polymerized ethylenically unsaturated monomers and have from 4 to about 10 sulfur atoms on each of the crown rings. In some embodiments of the invention, a linkage "M" connects the thiacrown ether ring structures and the polymers and M is O; S; COO; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl.

17 Claims, No Drawings

THIACROWN ETHER COMPOUND CORROSION INHIBITORS FOR ALKANOLAMINE UNITS

FIELD OF THE INVENTION

The present invention relates the inhibition of corrosion in aqueous alkanolamine units. More particularly, the present invention relates to methods of inhibiting corrosion of metals in contact with aqueous alkanolamine solutions in acid gas removal amine units using thiacrown ether compounds.

BACKGROUND OF THE INVENTION

The conditioning of naturally occurring liquid and gas streams by absorbing acid gases such as $CO_2$ and $H_2S$ in an absorbent solution is a well known commercial practice. Acid gas removal is commonly practiced in the oil refining, natural gas recovery, ammonia plant and wood pulp industries. For example, when crude oil and natural gas are removed from a formation they frequently contain $CO_2$ or $H_2S$ (acid gases). Acid gases are removed from the hydrocarbon in an acid gas removal amine system (amine unit). Amine units are typically constructed of carbon steel and operate at temperatures of from about 110° to about 300° F., at pressures of from about 10 to about 500 psig and with less than about 10 ppm of oxygen present as an undesirable contaminant in the aqueous alkanolamine solution. An amine unit utilizes an alkanolamine such as monoethanolamine (MEA), diethanolamine (DEA), methyldiethanolamine (MDEA), diisopropylamine (DIPA), and diglycolamine (DGA) in an aqueous solution. The hydrocarbon containing acid gases are contacted with the aqueous amine solution in a tray or packed absorber where the amine reacts with the acid gases thereby removing them from the hydrocarbon and forming an aqueous amine solution containing the absorbed acid gases (rich stream). The amine-acid gas reaction is later reversed in a plate or packed stripper resulting in an acid gas stream and a reusable aqueous amine solution (lean stream).

Amine units present a variety of corrosion control problems. Unreacted carbon dioxide dissolved in the aqueous alkanolamine solution forms acid species which are corrosive to metals. Oxygen can enter an amine unit through storage tanks, sumps, surge vessels, and the like and attack metals causing corrosion. Oxygen also can oxidize the alkanolamine. Oxidation and degradation products of alkanolamines can cause metal corrosion. Efforts to control corrosion in amine units usually focus on the use of metallurgy, minimization of acid gas flashing, filtration, stress relieving, process controls and corrosion inhibitors such as metal passivating agents. However, environmental and safety concerns have limited the practicality of using some materials such as nickel, cobalt, calcium, copper, chromium, zinc, tin, aluminum, magnesium and cyano compounds and the like as corrosion inhibiting agents. Since corrosion, if left untreated, can cause shut-down of an amine unit, corrosion control is a very important consideration. In addition, most corrosion control efforts have focused on treating the rich stream of the amine unit. However, the lean sections of amine units also experience corrosion.

Therefore, a need exists for compositions which when added to an aqueous alkanolamine solution in an acid gas removal amine unit inhibits corrosion of metals in contact with the aqueous alkanolamine solutions and which are effective for inhibiting corrosion in both the rich and lean portions of the amine unit.

Accordingly, it is an object of the present invention to provide compounds for inhibiting corrosion of metals in contact with aqueous alkanolamine solutions.

It is an additional object of the present invention to provide aqueous acid gas removal solutions for use in amine units which are inhibited against acid gas promoted corrosion of metals.

It is yet another object of this invention to provide a method for inhibiting corrosion of metals in contact with aqueous alkanolamine solutions in amine acid gas removal units.

PRIOR ART

J. Buter et. al. Organic Synthesis Vol. 65, pages 150–158 (1987) teaches the synthesis of thiacrown ether 1,4,8,11-tetrathiacyclotetradecane. The synthesis is conducted by first reacting 1,3-propanedithiol with 2-chloroethanol to form 3,7-dithianonan-1,9-diol. This diol is reacted with thiourea to give 3,7-dithianonane-1,9-dithiol. The dithiol is then reacted with 1,3-dibromopropane to give 1,4,8,11-tetrathiacyclotetradecane.

Richard E. DeSimon et. al. proposes in J. Am. Chem. Soc. 97, 942 (1975) an "inside out" crystal structure involving the distortion of C-4 and C-5 carbon atoms in 1,4,8,11-tetrathiacyclotetradecane (abbreviated as 14-S-4) when it is forming a complex with $NbCl_5$ in benzene.

Masao Tomoi et. al. describes in Japan Kokai 55-19221 and Makromol. Chem. 184, pp. 2431–2436 (1983) a macrocyclic bound to a crosslinked polystyrene resin support. The polythiaethers are disclosed to be highly efficient adsorbents of Ag (I) and moderately effective adsorbants for Cu(II). The thiacrown ethers/macroporous polystyrene resins are disclosed as being in solid form and as being reuseable.

Keiji Yamashita et. al. describe in Reactive and Functional Polymers 31, 47–53 (1996) the polymerization and copolymerization of 6-(4'-vinylbenzyloxy)-1,4,8,11-tetrathiacyclotetradecane and 9-(4'-vinylbenzyloxy)-1,4,7,14,17-hexathiacycloeicosane with styrene or N-vinylpyrrolidone. Polymers were studied for their ability to bind Ag(I) and Hg(II).

U.S. Pat. No. 5,071,581 to R. Cipriano discloses monomeric crown ethers (i.e., having only one crown ether in a molecule of the ether) and polymeric crown ethers (i.e., having at least one but possibly more crown ethers in a polymeric chain) wherein sulfur atoms replace oxygen atoms. The polymeric crown ethers are disclosed as being useful as a component of electrorheological fluid. The structure and configuration of the thiacrown compounds of the present invention are not disclosed.

WO 96/38493 discloses water-soluble polymers having particular formulas, functionalized by various groups. Thiocrown ethers are listed among the polymer substituents. The structure and configuration of the thiacrown compounds of the present invention are not disclosed.

U.S. Pat. No. 3,133,028 to Kenhere discloses that corrosion of metals in contact with water can be inhibited by the use of water-soluble hexavalent chromium compounds in conjunction with water-soluble thiocyanates, and/or water soluble thiourea compounds of the type represented by the formula:

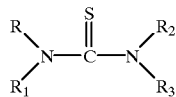

where R, $R_1$, $R_2$ and $R_3$ are selected from the group consisting of hydrogen, alkali metal, and alkyl radicals containing from 1 to 4 carbon atoms. Zinc compounds are also disclosed as corrosion inhibiting compounds when used in conjunction with water-soluble hexavalent chromium.

U.S. Pat. No. 4,100,100 to Clouse et al. discloses the corrosion of iron and steel by an aqueous sour gas conditioning solution to remove $CO_2$ from a gas stream is inhibited by a combination of a quaternary pyridinium salt and an organic thioamide or water-soluble thiocyanate and a water-soluble cobalt salt. The patent discloses that the cobalt compound, the thio compound or the pyridinium salt alone will provide no inhibition or only partial inhibition.

U.S. Pat. No. 4,102,804 to Clouse et al. discloses the corrosion of iron and steel in an aqueous sour gas conditioning system is inhibited by a combination of a quaternary pyridinium salt and an organic thioamide, a water-soluble sulfide or a water-soluble thiocyanate. The patent also discloses that either the thio compound or the pyridinium salt alone will provide no inhibition or only partial inhibition.

U.S. Pat. No. 4,446,119 to DuPont et al. discloses a corrosion inhibited composition containing a gas conditioning solution such as an alkanolamine with water or with organic solvents and with soluble thiocyanate compounds, soluble trivalent bismuth compounds with or without soluble divalent nickel or cobalt compounds.

U.S. Pat. No. 4,431,563 to Krawcyzk et al. discloses that corrosion of ferrous metals in gas conditioning apparatus is inhibited by using a gas conditioning solution such as aqueous alkanolamines which contain thionitrogen compounds such as metal thiocyanates or thioamides. The patent discloses that metals such as cobalt, nickel, calcium, copper, chromium, zinc, tin, aluminum and magnesium will dissolve from the equipment after a few days of recycling the gas conditioning solution or these metals may be introduced into the gas conditioning solution as additives. The metals in the gas conditioning solution act as a synergist with the thionitrogen compounds to inhibit metal corrosion in the gas conditioning apparatus.

U.S. Pat. No. 4,541,946 to Jones et al. discloses a corrosion inhibitor composition useful for preventing corrosion by solvents used in treating sour gas streams comprising a quaternary pyridinium salt, a surface-active and/or a thio compound and a water soluble nickel compound. The thio compound can be an organic thioamide or preferably a water-soluble thiocyanate. The patent also discloses that the nickel compound, the thio compound, the surface-active compound or the pyridinium salt, when used alone, provide little or no corrosion inhibition.

U.S. Pat. No. 4,595,723 to Henson et al. discloses a thioureaamine-formaldehyde based polymer used in combination with a nickel (II) ion for inhibiting corrosion of ferrous metals and its alloys in gas conditioning service using aqueous monoethanolamine to scrub carbon dioxide.

U.S. Pat. No. 4,596,849 to Henson et al. discloses a thioureaamine-formaldehyde based polymer used in combination with a copper (II) ion for inhibiting corrosion of ferrous metals and its alloys in gas conditioning service using aqueous monoethanolamine to scrub carbon dioxide containing oxygen.

U.S. Pat. No. 5,531,937 to Minevski et al. discloses non-sulfur based compositions comprising water soluble n-alkyl morpholine, saturated dicarboxylic acid and optionally alkanolamine and optionally surfactants for inhibition of ferrous metal corrosion in oxygen-free solutions.

SUMMARY OF THE INVENTION

To achieve the foregoing objects, the present invention provides compositions for inhibiting corrosion of metals in contact with aqueous alkanolamine solutions. The compositions are thiacrown ether and polymeric thiacrown ether compounds having from 4 to about 10 sulfur atoms on each of the crown rings which are effective for inhibiting corrosion in alkanolamine acid gas removal systems. The polymeric thiacrown ether ring structures have from 4 to about 10 sulfur atoms on each of the crown rings and each of the crown rings are substituted with polymers. In some embodiments of the invention, a linkage "M" connects the thiacrown ether ring structures and the polymers and M is O; COO where the carbon atom is attached to the polymer; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; or M is S with the proviso that the polymer cannot be polyethyleneimine. Unless specified otherwise, the term "thiacrown compound(s)" is used herein to mean thiacrown ether and/or polymeric thiacrown ether compounds.

The invention also provides aqueous acid gas removal solutions inhibited against acid gas promoted corrosion of metals. The solutions are comprised of thiacrown compounds in aqueous alkanolamine solutions.

The invention further provides a method for inhibiting corrosion of metals in contact with aqueous alkanolamine solutions. The method comprises adding an amount of thiacrown compound to an aqueous alkanolamine solution, sufficient to establish a concentration of thiacrown compound in the aqueous solution which is effective for the purpose of inhibiting metal corrosion in an amine acid gas removal unit.

DETAILED DESCRIPTION OF THE INVENTION

In accordance with the present invention, a composition and a method for inhibiting corrosion of metals in contact with aqueous alkanolamine solutions is provided. The present inventors have discovered that one or more thiacrown compounds, when added to an aqueous alkanolamine solution, significantly inhibits corrosion of ferrous metals in contact with the alkanolamine solution. In addition, the inventors have discovered that thiacrown compounds of this invention are effective for inhibiting metal corrosion in both the rich and lean portions of aqueous alkanolamine unit acid gas removal equipment. The thiacrown compounds of this invention are thiacrown ethers and polymeric thiacrown ether compounds. The invention thiacrown ethers have 4 to about 10 sulfur atoms, in the crown ring, whether substituted or unsubstituted and have the formula shown by Formula 1:

Formula 1

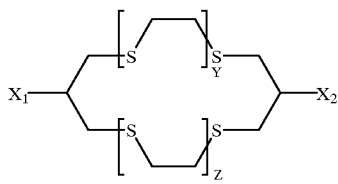

where Y is an integer of 1 to 7 and Z is an integer of 1 to 4 with the proviso that Y+Z cannot be greater than 8; $X_1$ and $X_2$ are independently H; SH; F; Cl; I; substituted or unsubstituted $C_6$ to $C_{10}$ linear or branched alkyl or alkenyl group; substituted or unsubstituted $C_6$ to $C_{10}$ aryl group; amine; mono- or di- $C_1$ to $C_{10}$ lower alkylamino; $C_1$ to $C_{10}$ lower alkanoylamino; nitro; cyano; COOH; OCOR, wherein $R_1$ is $C_1$ to $C_{10}$ alkyl or alkenyl group; $OR_2COOR_3$ wherein $R_2$ is substituted or unsubstituted $C_2$ to $C_5$ linear or branched alkyl group and $R_3$ is substituted or unsubstituted $C_1$ to $C_{10}$ linear or branched alkyl group or alkenyl group; $OR_4$ where $R_4$ is substituted or unsubstituted $C_1$ to $C_{10}$ linear or branched alkyl or alkenyl group; or $SR_5$ wherein $R_5$ is substituted or unsubstituted $C_1$ to $C_{10}$ linear or branched alkyl or alkenyl group; wherein the substituents of the $X_1$ and $X_2$ substituted moieties are independently OH, SH, F, Br, Cl, I, COOH, amine, mono- or di- $C_1$ to $C_{10}$ alkylamino, alkanoylamino or nitro and with the proviso that both $X_1$ and $X_2$ cannot both be H.

The polymeric thiacrown ethers of the present invention have 4 to about 10 sulfur atoms, preferably have 4 to about 6 sulfur atoms in the crown ring and are thiacrown ethers attached directly to or linked with polymer chains or networks. The polymeric thiacrown ethers of the present invention have the formulas shown by Formulas 2, 3, 4 and 5:

Formula 2

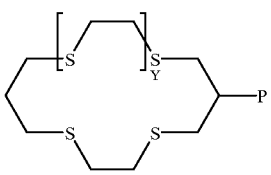

Formula 3

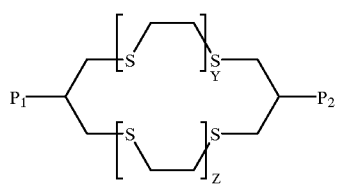

Formula 4

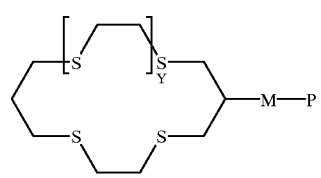

Formula 5

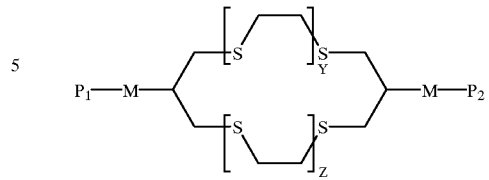

where Y is an integer of 1 to 7, Z is an integer of 1 to 4 with the proviso that Y+Z cannot be greater than 8; M is a linkage between the thiacrown compound and the polymers P, $P_1$ and $P_2$ and M is O; COO where the carbon atom is attached to the polymer; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; or M is S with the proviso that the polymer cannot be polyethyleneimine. The polymeric thiacrown ethers of the present invention can be a polymer chain attached to one or more thiacrown moieties or the polymeric thiacrown ethers can be difunctional thiacrown moieties interconnecting polymers as illustrated in Formulas 3 and 5. The polymers P, $P_1$ and $P_2$ in Formulas 2–5 can be obtained from polymerization of monomers containing ethylenically unsaturated compounds. Examples of such monomers include but are not limited to hydroxypropyl acrylate, (meth) acrylamide, (meth)acrylic acid, dimethylaminoethyl (meth) acrylate, diethylaminoethyl (meth)acrylate, dimethylaminopropyl (meth)acrylamide, diethylaminopropyl (meth) acrylamide and dimethylaminopropyl (meth)acrylate, and their quaternary salts obtained by treating dimethylaminoethyl (meth)acrylate, diethylaminoethyl (meth)acrylate, dimethylaminopropyl (meth)acrylamide, diethylaminopropyl (meth)acrylamide, and dimethylaminopropyl (meth) acrylate with methyl chloride, dimethyl sulfate or benzyl chloride, N-vinyl pyrrolidinone, hydrophobic monomers such as alkyl esters derived from the reactions of alkanols having from 1 to about 16 carbon atoms with ethylenically unsaturated carboxylic acids such as acrylic acid, methacrylic acid, maleic anhydride, fumaric acid, and itaconic acid including ethylhexyl acrylate (EHA), dodecyl(meth) acrylate, octadecyl acrylate, diethyl maleate and hydroxy substituted derivatives of the monomers described above.

More than one monomer can be used to prepare the polymeric thiacrown ethers of the present invention. The preferred monomers for making the polymeric thiacrown ethers of this invention are acrylamide, acrylic acid and hydroxypropyl acrylate.

The polymer portions of the polymeric thiacrown ethers of the present invention can also be obtained by ring-opening polymerization of heterocyclic compounds such as aziridine, epoxide, lactone or lactam. One of the preferred polymers for use in preparing the polymeric thiacrown ethers of this invention is polyethyleneimine (PEI), obtained from the ring-opening polymerization of aziridine. It is commercially available from BASF Corporation under the trade name LUPASOL® (CAS 9002-98-6) with a molecular weight (Mw) of 10,000. However, other lower or higher molecular weight or more crosslinked/branched PEI may also be used for the reaction and are within the scope of the invention. For instance, PEI prepared by the polymerization of aziridine and capped with ethylenediamine (CAS 25987-06-8) or crosslinked with 1,2 dichloroethane (CAS 68130-87-2) can also be utilized in the synthesis of the PEI thiacrown ether containing materials of the present invention. The following formula shows a representative thiacrownpolyalkyleneimine of this invention:

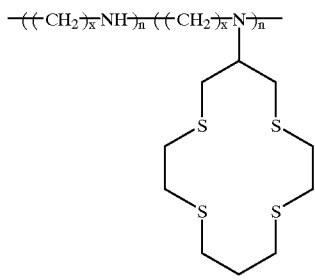

where x=2 to 4 and n=1 to 100,000

Oligomeric polyalkyleneamines are also within the scope of the invention. Some examples are tetraethylenepentamine (TEPA), triethylenetetramine (TETA), diethylenetriamine (DETA), and diethylenetriaminepentaacetic acid (DTPA). One of the preferred polyamines for use in preparing the polymeric thiacrown ethers of this invention is tetraethylenepentamine. The following formula shows a representative oligomeric thiacrownpolyalkyleneimine of this invention:

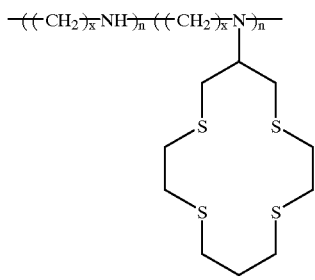

where x=2 to 4 and n=1 to 10.

The polymeric portion of the polymeric thiacrown ethers of this invention can also be prepared by free radical, cationic or anionic polymerization methods in accordance with conventional solution, precipitation, or emulsion polymerization techniques. Polymerization initiators such as azo compounds, persulfates, peroxides, UV light, etc., may be used. Chain transfer agents such as alcohols, amines, or mercapto compounds may be used to regulate the molecular weight of the polymer. Polymers obtained by condensation polymerization techniques such as polyesters or polyamines prepared by the condensation of epichlorohydrin with amines including mono or dialkyl substituted amines are also within the scope of the invention.

The polymeric portion of the polymeric thiacrown ethers of this invention can have linear, branched/crosslinked, block, or graft configurations. Suitable polymers for use in synthesizing the polymeric thiacrown ethers of this invention have number average molecular weights (Mn) of from about 200 to about 1,000,000; preferably from about 500 to about 1,000,000 and most preferably from about 1000 to about 1,000,000. Suitable polymers may be soluble or dispersible in water, or may be soluble or dispersible in organic solvents. The solubility of the polymeric thiacrown ethers of this invention can be varied by the type of monomer, initiator, crosslinking agent, and polymerization method used to create the polymeric portion of the polymeric thiacrown ethers of this invention. For instance, monomers such as acrylic acid, acrylamide, or N-vinylpyrrolidinone could be used to impart water solubility to the invention polymeric thiacrown ethers. Whereas, hydrophobic monomers such as long chain alkyl esters can enhance the solubility of the polymeric thiacrown ethers of this invention in organic solvents.

The following are representative reactions by which the thiacrown compounds of this invention can be made. In the following reactions X is independently H; SH; F; Cl; I; substituted or unsubstituted $C_1$ to $C_{10}$ linear or branched alkyl or alkenyl group; substituted or unsubstituted $C_6$ to $C_{10}$ aryl group; amine; mono- or di- $C_1$ to $C_{10}$ lower alkylamino; $C_1$ to $C_5$ lower alkanoylamino; nitro; cyano; COOH; $OCOR_1$ wherein $R_1$ is $C_1$ to $C_{10}$ alkyl or alkenyl group; $OR_2COOR_3$ wherein $R_2$ is substituted or unsubstituted $C_2$ to $C_5$ linear or branched alkyl group and $R_3$ is substituted or unsubstituted $C_1$ to $C_{10}$ linear or branched alkyl group or alkenyl group; $OR_4$ where $R_4$ is substituted or unsubstituted $C_1$ to $C_{10}$ linear or branched alkyl or alkenyl group; $SR_5$ wherein $R_5$ is substituted or unsubstituted $C_1$ to $C_{10}$ linear or branched alkyl or alkenyl group; wherein the substituents of the X moieties are independently OH, SH, F, Br, Cl, I, COOH, amine, mono- or di- $C_1$ to $C_5$ alkylamino, alkanoylamino or nitro. For convenience, the following reactions are described with reference to thiacrown ether compounds containing 4 sulfur atoms, however it is within the scope of this invention that the same types of reactions also can be conducted for thiacrown ether compounds of the present invention having more than 4 sulfur atoms, preferably from 4 to about 10 sulfur atoms and most preferably from 4 to about 6 sulfur atoms.

Reaction 1

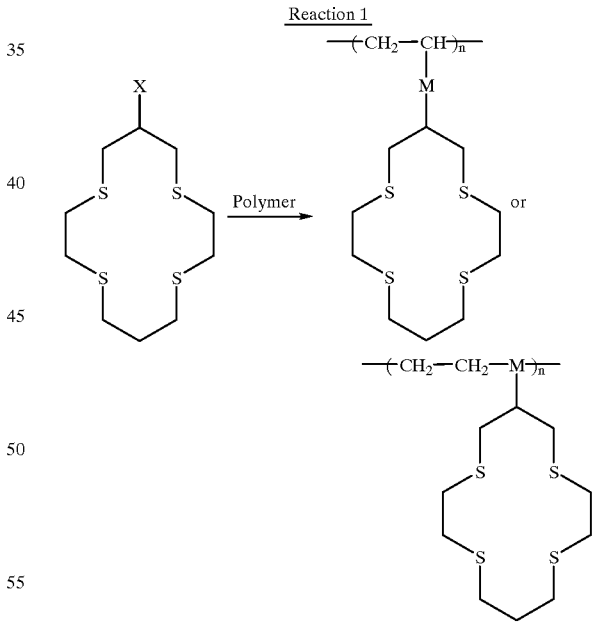

wherein n is an integer number of monomer repeating unit from 1 to about 100,000 and —COO— where the carbon atom is attached to the polymer is an example of the group M. The thiacrown molecule can also be attached to the ethylenically unsaturated or cyclic compounds described herein to form thiacrown functionalized monomers and which can then be polymerized alone or with other monomers to form the invention polymeric thiacrown compounds as shown in Reaction 2:

Reaction 2

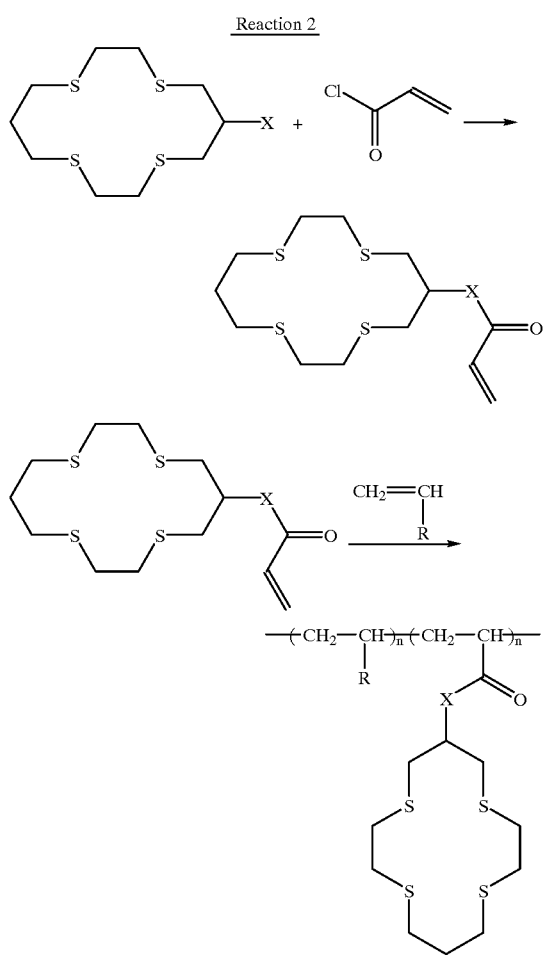

wherein CH$_2$=CHR is an ethylenically unsaturated monomer, R represents a pendent organic moiety, and n is an integer number of monomer repeating unit from 1 to about 100,000.

In addition, thiacrown ethers of Formula 2 having X=SH or OH group can be used as a chain transfer agent for polymerization of ethylenically unsaturated monomers wherein the thiacrown can be attached to the polymer directly or by a linkage M as described above, to obtain the desired polymers containing thiacrown ether moieties as shown in Reactions 3 and 4.

Reaction 3

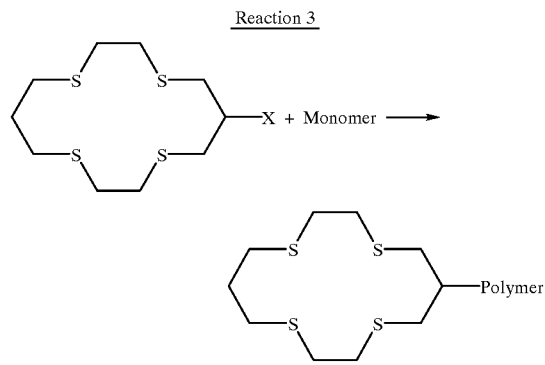

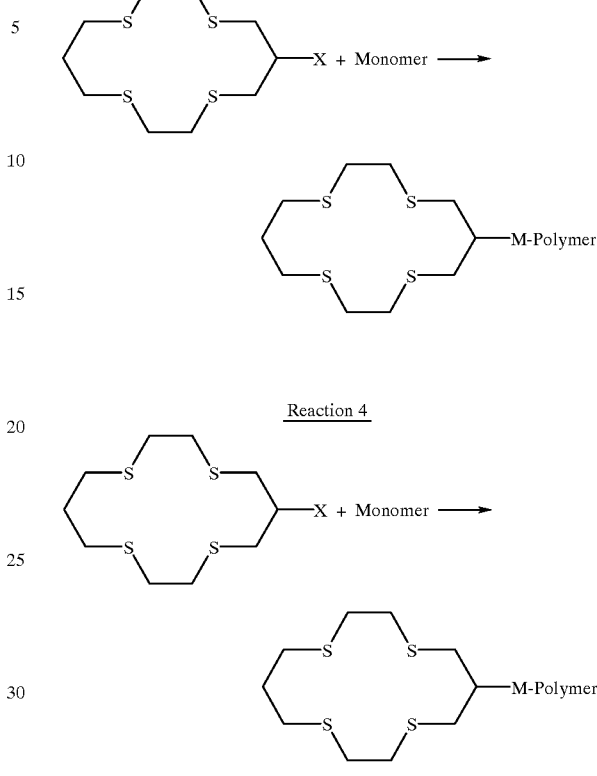

The aforementioned synthesis methods do not in any way limit the preparation of polymeric thiacrowns ethers according to the invention but are merely illustrative of how these invention thiacrown compounds can be synthesized.

The preferred polymeric thiacrowns ethers embodiments of this invention have the following formulas represented by Formulas 6, 7 and 8:

Formula 6

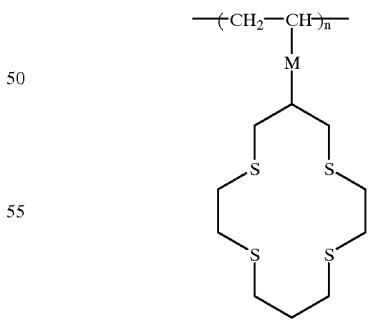

wherein M is preferably CONH; CH$_2$O; or COO where the carbon atom of the COO group is attached to (—CH$_2$—CH—)$_n$ or Formula 7

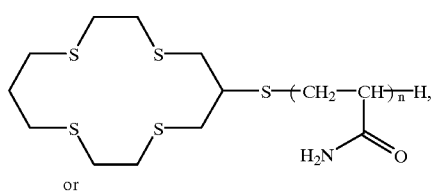

or

Formula 8

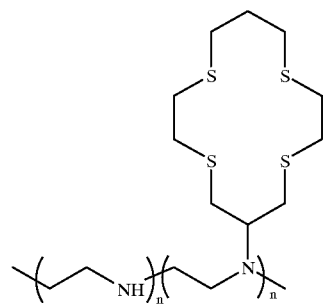

wherein n in Formula 6, 7 and 8 is an integer number of monomer repeating unit from 1 to about 100,000.

The thiacrown compounds of this invention have utility as metal corrosion inhibitors, and are particularly useful as ferrous metal corrosion inhibitors in alkanolamine acid gas removal systems.

The thiacrown compounds of this invention can be added neat to an alkanolamine solution in an amine unit or can be added diluted with water, a suitable solvent or cosolvent and/or with an alkanolamine solution. Preferably, the thiacrown compounds are added diluted in an aqueous alkanolamine solution.

The amount of thiacrown compound which will be added to an amine unit to inhibit corrosion will vary depending on the operating conditions of each amine unit. However, it is expected that from about 1 to about 2500 parts thiacrown compound per million parts aqueous alkanolamine solution (ppm) will be effective to inhibit corrosion of metals in contact with an aqueous alkanolamine solution within an amine unit. The preferred treatment level of thiacrown compound added to an aqueous alkanolamine solution in an amine unit to inhibit corrosion is from about 2.5 ppm to about 2000 ppm and the most preferred treatment level is from about 2.5 ppm to about 1000 ppm.

On a weight percent basis, the corrosion inhibited alkanolamine solution is comprised of about 15 to 75 weight percent alkanolamine, about 25 to 85 weight percent water and less than about 1 weight percent thiacrown compound with the proviso that the sum of the weight percentages equals 100 weight percent.

In order to show the successful synthesis of thiacrown compounds and the efficacy of inhibiting corrosion of metals in contact with aqueous alkanolamine solutions, various tests were performed. The examples are to be regarded solely as illustrative, and not as restricting the scope of the invention.

EXAMPLES

Thiacrown compounds containing ten carbon atoms and four sulfur atoms (14-S-4 thiacrown compound where "14" is the total number of atoms in a ring and "4" is the number of sulfur atoms in a ring) in each thiacrown ring moiety are illustrated in the following examples, however thiacrown compounds having from 4 to 10 sulfur atoms in each thiacrown ring moiety are within the scope of this invention.

Example 1

Synthesis of 1,4,8,11-tetrathia-6-cyclotetradecane bromide.

A 1,4,8,11-tetrathia-6-cyclotetradecanol compound was prepared according to the synthesis disclosed by Masao Tomoi et al. Fifteen grams of the 1,4,8,11-tetrathia-6-cyclotetradecanol compound was mixed in 150 mL of chloroform at room temperature and treated with 16.4 g of thionyl bromide. The reaction was stirred for 4 hours, and then was poured over 100 mL of water. The organic layer was washed three times with 5% sodium carbonate and once with saturated sodium chloride solution. The organic layer was dried over anhydrous magnesium sulfate and then concentrated to yield an oily product weighing 15.1 grams. The identity of the product, having the formula:

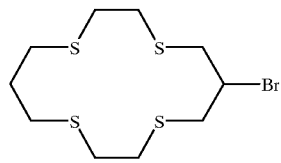

was substantiated as 1,4,8,11-tetrathia-6-cyclotetradecane bromide by $^1$H Nuclear Magnetic Resonance (NMR) {(CDCl$_3$) d 4.26 (m, 1 H), 3.30 (m, 2H), 3.13 (m, 2H), 2.91 (m, 7H), 2.73 m, 5H), 1.95 (m, 2H)}.

Example 2

Synthesis of 1,4,8,11-tetrathia-6-cyclotetradecanethiol.

A 5.7 gram sample of 1,4,8,11-tetrathia-6-cyclotetradecane bromide from Example 1 was mixed with 1.3 grams of thiourea in 60 mL of 95% ethanol. The mixture was refluxed for 15 hours, before being treated with a solution of 1.0 g of sodium hydroxide in 50 mL of water. The mixture was refluxed for 3 hours. Ethanol was then removed under reduced pressure, and the aqueous solution was acidified with concentrated sulfuric acid to pH 2–3. The acidic solution was extracted three times with methylene chloride. The combined organic layers were dried over magnesium sulfate and then concentrated to give the resulting product as an oil (3.9 g) with 79% yield. The product formula was identified as:

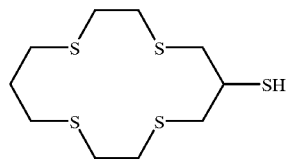

by $^1$H NMR {(CDCl$_3$) d 3.07 (m, 3H), 2.85 (m, 10H), 2.68 (m, 4H), 1.98 (m, 2H), 1.85 (m, 1H) and IR (NaCl) 2926, 2542 (S—H), 1424, 1201 cm$^{-1}$} and both gas chromatography-mass spectroscopy (GC-MS) and liquid chromatography-mass spectroscopy (LC-MS) analysis revealed that the product had the correct molecular weight of 300.

Example 3

Polymerization of acrylamide in the presence of 1,4,8,11-tetrathia-6-cyclotetradecanethiol and 2,2'-azobis(2,4-imethylvaleronitrile) (Vazo-52).

A 0.17 gram sample of 1,4,8,11-tetrathia-6-cyclotetradecanethiol from Example 2 was mixed in 15 mL of tetrahydrofuran. This mixture was sparged with nitrogen and heated to 50° C. A 10 mL aliquot of tetrahydrofuran containing 0.07 gram portion of Vazo-52 and 10 mL aliquot of tetrahydrofuran containing 2.0 grams of acrylamide were simultaneously added to the mixture over 2 to 4 hours. The reaction was heated for 2 additional hours after the addition was complete. The product which precipitated during the course of the reaction was filtered from the mixture. The solid precipitate was dissolved in 10 mL of water and added to 200–300 mL of methanol, while stirring, to re-precipitate and purify the product. The product was a white solid weighing 1.3 grams and was identified by $^1$H NMR {(D$_2$O) d 2.80, 2.25, 2.14, 1.70, 1.58} and $^{13}$C NMR {(D$_2$O) d 180.0, 179.6, 49.3, 42.2, 36.3, 34.9, 33.0} to have the formula:

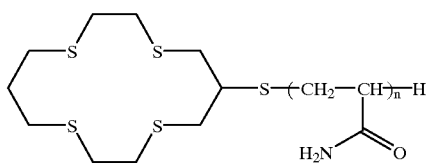

The existence of sulfur in the compound was verified by elemental analysis. In addition, Gel Permeation Chromatography (GPC) indicated the polymeric thiacrown a molecular weight range of about 3,200 to 17,000.

Example 4

Reaction of 1,4,8,11-tetrathia-6-cyclotetradecane bromide with polyethyleneimine(PEI).

A mixture of polyethyleneimine (1.0 g, BASF LUPASOL®, Mw 10,000) and 1,4,8,11-tetrathia-6-cyclotetradecane bromide of Example 1 (0.4–1.2 g) was heated at 50° C. in 20 mL of ethanol for 4–5 hours. After heating, the reaction mixture was treated with 20 mL of water, and the ethanol was removed. The product had a formula of:

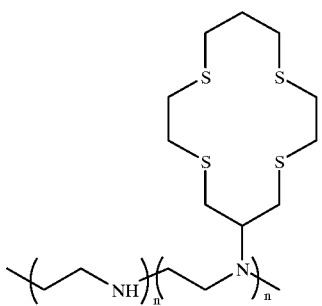

characterized by $^{13}$C NMR (H$_2$O) {d 55.8, 54.7, 53.4, 51.5, 50.6, 48.2, 46.2, 40.3, 38.4, 32.2, 30.4}.

The polyethyleniemine (PEI) used in this example is commercially available from BASF Corporation under the trade name LUPASOL® with a molecular weight (Mw) of 10,000. However, other lower or higher molecular weight or crosslinked/branched PEI can also be used for the reaction and is also within the scope of the invention, Example 5

Reaction of 1,4,8,11-tetrathia-6-cyclotetradecane bromide with tetraethylenepentamine.

A mixture of tetraethylenepentamine (1.0 g) and 1,4,8, 11-tetrathia-6-cyclotetradecane bromide of Example 1 (2.0 g) was heated at 50° C. in 30 mL of ethanol for 4–5 hours. After heating, the reaction mixture was treated with 30 mL of water, and the ethanol was removed. The product can be represented by the formula:

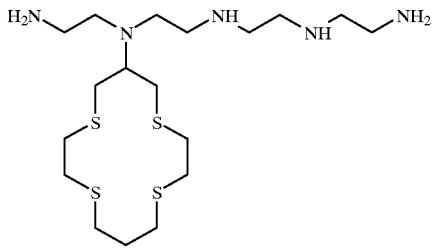

characterized by $^1$H NMR (D$_2$O){δ 3.94, 2.72, 2.66, 2.61, 2.46, 1.87} and $^{13}$C NMR (H$_2$O) {δ 64.8, 56.4, 52.4, 52.2, 47.9, 47.4, 45.3, 40.8, 39.4, 37.1, 31.9, 31.3, 30.2, 29.9, 24.4}.

Example 6

Synthesis of Thiacrown Acrylate

A 4.0 gram portion of 1,4,8,11-tetrathia-6-cyclotetradecanol was treated with 0.7 grams of sodium hydride in 40 mL of tetrahydrofuran (THF). After mixing for 30 minutes, 1.3 grams of acryloyl chloride was added. The mixture was stirred for 17 hours and then water was added to quench any unreacted sodium hydride. The THF was removed and then the aqueous layer was extracted three times with CH$_2$Cl$_2$. The combined organic layers were dried over magnesium sulfate and then concentrated to give 4.0 grams (84% yield) of a waxy solid. The product was characterized by $^1$H NMR (CDCl$_3$){d 6.48 (dd, 1H), 6.18 (dd, 1H), 5.92 (dd, 1H), 5.18 (m, 1H), 3.01–2.70 (m, 16H), 1.99 (m, 2H)} and identified as:

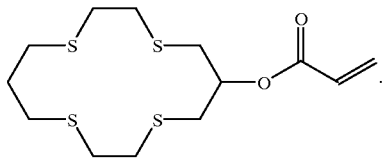

Example 7

Copolymerization of Thiacrown Acrylate with Acrylic Acid.

Twenty grams (20 g) of tetrahydrofuran (THF) was sparged with N$_2$(gas) while heating to 65° C. Once at 65° C. the sparge was stopped, and a solution of thiacrown acrylate (0.8 g) and acrylic acid (1.7 g) dissolved in 6 g of THF was added via a syringe pump over 4 hours. Another solution containing 1 mole % 2,2'-azobisisobutyronitrile (AIBN) in 5 g of THF was added simultaneously via a syringe pump over 4.5 hours. After additions were complete, the reaction was held at 65° C. for 2 hours. After cooling the reaction to room temperature, the THF was removed under reduced pressure. The product was characterized by $^1$H NMR (CD$_3$OD) {δ 3.1–2.7, 2.5, 2.0–1.7} and $^{13}$C NMR (CD$_3$OD) {δ 177.4, 163.9, 67.0, 41.7, 35.2, 31.5, 25.2, 13.5} and identified as:

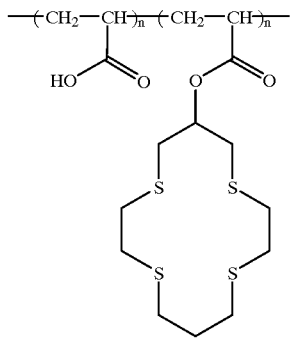

Example 8

A standard three electrode system was used to evaluate the corrosion inhibiting effect of various amounts of polymeric thiacrown compounds on metal in contact with an aqueous alkanolamine solution.

Test conditions simulated conditions in the lean portions of an amine unit by using an alkanolamine solution which had been purged with argon. Rich portions of an amine unit were simulated by using an alkanolamine purged with $CO_2$ or a mixture of alkanolamine and $Na_2S$ purged with $CO_2$. The alkanolamine solutions used to simulate an alkanolamine solution in acid gas removal service were either 35 weight percent or 30 weight percent diethanolamine (DEA) with 100 ppm formic acid, 240 ppm acetic acid, 360 ppm NaCl, 250 ppm $NaSO_4$ and the balance to 100 weight percent deionized water.

Mild steel 1018 electrodes in the form of a disk were used as the metal simulating the metal in amine unit equipment. The temperature ranged from about 190° F. to about 216° F. Gases were either purged continuously through the solution in the electrochemical glass cell or 20–80 psi of $CO_2$ pressure was applied in an autoclave.

The results are shown in the tables below where "ppmA" means parts per million of actives:

TABLE I

Inhibition (% Protection) from electrochemical measurements after 44 hours in 35 wt. % DEA in the presence of thiacrownpolyacrylamide (TCPA) in water.

| Concentration TCPA/Temp. | Lean System, Ar | Rich System, $CO_2$ | Rich System $CO_2/H_2S$ |
|---|---|---|---|
| 20 ppmA/190.4° F. | 50 | 66 | 17 |
| 30 ppmA/190.4° F. | — | 86 | — |

TABLE II

Inhibition (Protection) from electrochemical measurements after 20 hours in 35 wt. % DEA in the presence of thiacrownpolyethyleneimine (TCPE) in water.

| Concentration TCPE/Temp. | Lean System, Ar | Rich System, $CO_2$ | Rich System $CO_2/H_2S$ |
|---|---|---|---|
| 5 ppmA/190.4° F. | 42 | 87 | — |
| 10 ppmA/190.4° F. | — | 94 | — |

TABLE III

Inhibition (% Protection) from electrochemical measurements after 20 hours in 30 wt. % DEA in the presence of thiacrownpolyacrylamide (TCPA).

| Concentration TCPA/Temp. | Lean System, Ar | Rich System, $CO_2$ | Rich System $CO_2/H_2S$ |
|---|---|---|---|
| 10 ppmA/190.4° F. | 33 | 67 | 0 |
| 20 ppmA/190.4° F. | — | 69 | — |
| 30 ppmA/190.4° F. | — | 92 | 0 |
| 30 ppmA/102° C. | 70 | 76 | — |

TABLE IV

Inhibition (% Protection) from electrochemical measurements after 40 hours in 30 wt. % DEA in the presence to thiacrownpolyethyleneimine (TCPE).

| Concentration TCPE/Temp. | Lean System, Ar | Rich System, $CO_2$ | Rich System $CO_2/H_2S$ |
|---|---|---|---|
| 5 ppmA/190.4° F. | — | 46 | 67 |
| 10 ppmA/190.4° F. | — | 88 | 60 |
| 10 ppmA/190.4° F. | — | — | 74 |
| 5 ppmA/215.6° F. | 33 | 67 | — |
| 10 ppmA/215.6° F. | 44 | 87 | — |

TABLE V

Corrosion inhibition (% Protection) from comparative materials during electrochemical measurements after 20 hours in 30 wt. % DEA.

| Treatment & Concentration | Lean System Ar 100 ppm $H_2S$ | Rich System, $CO_2$ | Rich System, $CO_2$ 200 ppm $H_2S$ |
|---|---|---|---|
| polyacrylamide | | | |
| 40 ppmA/215.6° F. | — | 68 | — |
| polyethyleneimine | | | |
| 10 ppmA/190.4° F. | 7 | 36 | 65 |
| 20 ppmA/215.6° F. | 17 | 62 | — |
| thiacrown alcohol | | | |
| 700 ppmA/190.4° F. | — | 64 | 45 |
| 700 ppmA/215.6° F. | 4 | 33 | — | where "—" indicates that a test was not conducted under the indicated conditions.

where "—" indicates that a test was not conducted under the indicated conditions.

Example 9

A standard three electrode system was used to evaluate the corrosion inhibiting effect of various amounts of polymeric thiacrown compounds on metal in contact with an aqueous alkanolamine solution. The polymeric thiacrown compounds were 1- or 2-thiacrowntetraethylenepentamine (1- or 2- TC-TEPA), where 1 and 2 designate the number of thiacrowns attached to the polymer; "commercial" tetraethylenepentamine (TEPA); commercial TC-TEPA and thiacrownpolyehyleneimine (TC-PEI), where "commercial" means that molecules where synthesized from commercial grade chemicals.

The alkanolamine mixtures are shown below:
A—synthetic proprietary alkanolamine mix—40 wt %
B—diglycolamine (DGA) taken from an alkanolamine unit C—mixture of diethanolamine and methyldiethanolamine (DEA/MDEA) taken from an alkanol amine unit D—synthetic DEA/MDEA mix E—field degraded DEA—30 wt %

Unless indicated otherwise, the measurements shown in Tables VI–X were obtained by exposing mild steel 1018 electrodes to an aqueous alkanolamine solutions for 6 hours without any thiacrown compound corrossion inhibitors present in the aqueous alkanolamine solutions (referred to as a "blank"), then the thiacrown compound corrossion inhibitors were added to the aqueous alkanolamine solutions and measuements were taken 18 hours after addition of the thiacrown compounds.

Concentration of $H_2S$ varied and code for superscripts are:

'100 ppm of $H_2S$ added

"200 ppm of $H_2S$ added

TABLE VI

Inhibition (% Protection) in various alkanolamine fluids measured after 6 hours without a thiacrown compound and 18 hours after addition of 2-thiacrowntetraethylenepentamine (2-TCTEP) at 190.4° F.

| Fluid | Concentration of 2-TCTEP (ppmA) | Lean System Ar | Rich System $CO_2$ |
|---|---|---|---|
| A | 10 | 57* | — |
| B | 10 | — | 92 |
| C | 10 | — | 50 |
| D | 5 | — | 77 |

*treatment added after 18 hours of blank

TABLE VII

Inhibition (% Protection) in various alkanolamine fluids measured after 6 hours without a thiacrown compound and 18 hours after addition of 1-thiacrowntetraethylenepentamine (1-TCTEP) at 190.4° F.

| Fluid | Concentration of 2-TCTEP (ppmA) | Rich System $CO_2$ | Rich System $CO_2/H_2S$' |
|---|---|---|---|
| D | 5 | 82 | — |
| D | 5 | — | 78' |
| E | 5 | 6 | — |
| E | 30 | 20 | — |
| E | 100 | 83 | — |

TABLE VIII

Inhibition (% Protection) in various alkanolamine fluids measured after 6 hours without a thiacrown compound and 18 hours after addition of of commercial tetraethylenepentamine (TEPA) at 190.4° F.

| Fluid | Concentration TEPA (ppmA) | Rich System $CO_2$ | Rich System $CO_2/H_2S$' |
|---|---|---|---|
| D | 20 | | 34' |
| D | 20 | 21 | — |

TABLE IX

Inhibition (% Protection) in various alkanolamine fluids measured after 6 hours without a thiacrown compound and 18 hours after addition of of commercial thiacrowntetraethylenepentamine (TCTEP) at 190.4° F.

| Fluid | Concentration TCTEP (ppmA) | Lean System Ar | Rich System $CO_2$ | Rich System $CO_2/H_2S$' or " |
|---|---|---|---|---|
| D | 2.5 | 78 | — | — |
| D | 2.5 | — | 56 | — |
| D | 2.5 | — | — | 86" |
| D | 5 | 75 | — | — |
| D | 5 | — | 60 | — |
| D | 5 | — | 72 | — |
| D | 5 | — | — | 80" |
| D | 10 | — | 84 | — |
| D | 10 | — | — | 88" |
| D | 20 | — | 82 | — |
| D | 20 | — | — | 64' |
| D | 100 | — | 88* | — |
| D | 100 | — | — | 90",* |

*treatment added after 18 hours of blank

TABLE X

Inhibition (% Protection) in various alkanolamine fluids measured after 6 hours without a thiacrown compound and 18 hours after addition of of commercial thiacrownpolyethyleneimine (TCPEI) at 190.4° F.

| Fluid | Concentration TCPEI of (ppmA) | Rich System $CO_2$ | Rich System" $CO_2/H_2S$ |
|---|---|---|---|
| D | 5 or 10 | 80 | — |
| D | 20 | 70 | — |
| D | 20 | — | 60" | where "—" indicates that a test was not conducted under the indicated conditions.

where "—" indicates that a test was not conducted under the indicated conditions.

The examples demonstrate that polymeric thiacrown ether compounds can be made and that such materials have particular efficacy as ferrous metal corrosion inhibitors in alkanolamine acid gas removal solutions.

Thus, the present invention provides thiacrown ether compounds effective for inhibiting corrosion of metals in contact with aqueous alkanolamine solutions.

The invention also provides aqueous acid gas removal solutions inhibited against acid gas promoted corrosion of metals. The solutions are comprised of an alkanolamine, at least one invention thiacrown compound and water.

The invention further provides a method for inhibiting corrosion of metals in contact with aqueous alkanolamine solutions. The method comprises adding an amount of thiacrown compound effective as a corrosion inhibitor, to an aqueous alkanolamine solution, sufficient to establish a concentration of the compound in the aqueous alkanolamine solution which is effective for the purpose of inhibiting metal corrosion. The thiacrown compounds of this invention are effective for inhibiting metal corrosion in both the rich and lean portions of an amine acid gas removal unit.

While this invention has been described with respect to particular embodiments thereof, it is apparent that numerous other forms and modifications of the invention will be obvious to those skilled in the art. The appended claims and this invention generally should be construed to cover all such obvious forms and modifications which are within the true spirit and scope of the present invention.

What is claimed is:

1. A method for inhibiting corrosion of metals in contact with an aqueous alkanolamine solution in an acid gas removal amine unit comprising adding to the aqueous alkanolamine solution an effective corrosion inhibiting amount of at least one of thiacrown ether compound or polymeric thiacrown ether compound effective as a corrosion inhibitor wherein the at least one of thiacrown ether compound or polymeric thiacrown ether compound is selected from one or more of the following formulas:

Formula 1

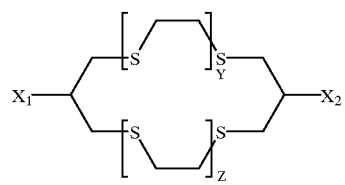

Formula 3

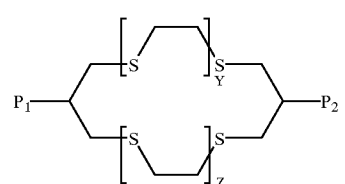

Formula 4

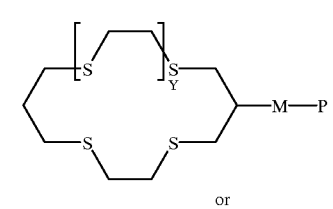

or

Formula 5

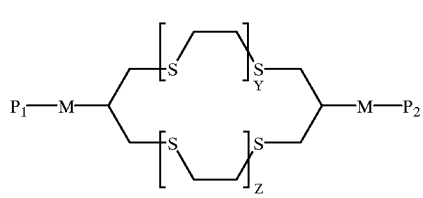

where Y is an integer of 1 to 7 and Z is an integer of 1 to 4 with the proviso that Y+Z cannot be greater than 8;

M is a linkage group and is selected from O; COO where the carbon atom is attached to P, $P_1$ and $P_2$; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; or M is S with the proviso that P, $P_1$ and $P_2$ are not polyethyleneimine;

P, $P_1$ and $P_2$ are polymers or oligomers in formulas 4 and 5;

$P_1$ and $P_2$ are selected from H, polymers, or oligomers in formula 3; and $X_1$ and $X_2$ are independently H; SH; F; Cl; I; substituted or unsubstituted $C_1$ to $C_{10}$ linear or branched alkyl or alkenyl group; substituted or unsubstituted $C_6$ to $C_{10}$ aryl; amine; mono- or di- $C_1$ to $C_{10}$ lower alkylamino; $C_1$ to $C_{10}$ lower alkanoylamino; nitro; cyano; COOH; $OCOR_1$ wherein $R_1$ is $C_1$ to $C_{10}$ alkyl or alkenyl group; $OR_2COOR_3$ wherein $R_2$ is substituted or unsubstituted $C_2$ to $C_5$ linear or branched alkyl group and $R_3$ is substituted or unsubstituted $C_1$ to $C_{10}$ linear or branched alkyl group or alkenyl group; $OR_4$ where $R_4$ is substituted or unsubstituted $C_1$ to $C_{10}$ linear or branched alkyl or alkenyl group; or $SR_5$ wherein $R_5$ is substituted or unsubstituted $C_1$ to $C_{10}$ linear or branched alkyl or alkenyl group; wherein the substituents of the $X_1$ and $X_2$ moieties are independently OH, SH, F, Br, Cl, I, COOH, amine, mono- or di- $C_1$ to $C_{10}$ alkylamino, alkanoylamino or nitro and with the proviso that both $X_1$ and $X_2$ cannot both be H.

2. The method of claim 1 wherein the at least one of thiacrown ether compound or polymeric thiacrown ether compound is a thiacrown ether compound having the formula:

Formula 1

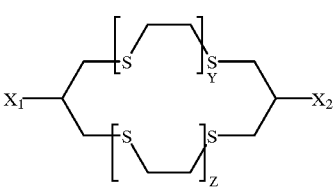

where Y is an integer of 1 to 7 and Z is an integer of 1 to 4 with the proviso that Y+Z cannot be greater than 8; $X_1$ and $X_2$ are independently H; SH; F; Cl; I; substituted or unsubstituted $C_1$ to $C_{10}$ linear or branched alkyl or alkenyl group; substituted or unsubstituted $C_1$ to $C_{10}$ aryl; amine; mono- or di- $C_1$ to $C_{10}$ lower alkylamino; $C_1$ to $C_{10}$ lower alkanoylamino; nitro; cyano; COOH; $OCOR_1$ wherein $R_1$ is $C_1$ to $C_{10}$ alkyl or alkenyl group; $OR_2COOR_3$ wherein $R_2$ is substituted or unsubstituted $C_2$ to $C_5$ linear or branched alkyl group and $R_3$ is substituted or unsubstituted $C_1$ to $C_{10}$ linear or branched alkyl group or alkenyl group; $OR_4$ where $R_4$ is substituted or unsubstituted $C_1$ to $C_{10}$ linear or branched alkyl or alkenyl group; or $SR_5$ wherein $R_5$ is substituted or unsubstituted $C_1$ to $C_{10}$ linear or branched alkyl or alkenyl group; wherein the substituents of the $X_1$ and $X_2$ moieties are independently OH, SH, F, Br, Cl, I, COOH, amine, mono- or di- $C_1$ to $C_{10}$ alkylamino, alkanoylamino or nitro and with the proviso that both $X_1$ and $X_2$ cannot both be H.

3. The method of claim 1 wherein the at least one of thiacrown ether compound or polymeric thiacrown ether compound is a polymeric thiacrown ether compound having a formula selected from the group consisting of:

Formula 3

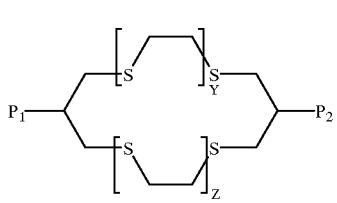

where Y is an integer of 1 to 7 and Z is an integer of 1 to 4 with the proviso that Y+Z cannot be greater than 8 and $P_1$ and $P_2$ are selected from the group consisting of H and polymerized ethylenically unsaturated monomers selected from the group consisting of hydroxypropyl acrylate; (meth)acrylamide; (meth)acrylic acid; dimethylaminoethyl (meth)acrylate; diethylaminoethyl (meth)acrylate; dimethylaminopropyl (meth)acrylamide; diethylaminopropyl (meth)acrylamide; dimethylaminopropyl (meth)acrylate; the quaternary salt of (meth)acrylamide, dimethylaminoethyl (meth)acrylate, diethylaminoethyl (meth)acrylate, dimethylaminopropyl (meth)acrylamide, diethylaminopropyl (meth)acrylamide and dimethylaminoxypropyl (meth)acrylate; alkyl esters derived from the reactions of alkanols having from 1 to about 16 carbon atoms with ethylenically unsaturated carboxylic acids; and hydroxy substituted derivatives of alkyl esters derived from the reactions of alkanols having from 1 to about 16 carbon atoms with ethylenically unsaturated carboxylic acids;

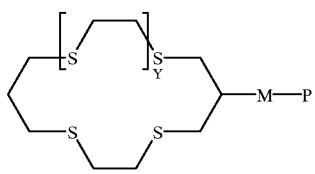

Formula 4 wherein Y is an integer of 1 to 7; wherein M is O; S; COO where the carbon atom is attached to P; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; and wherein P is a polymerized ethylenically unsaturated monomer selected from the group consisting of hydroxypropyl acrylate, (meth)acrylamide; (meth)acrylic acid; dimethylaminoethyl (meth)acrylate; diethylaminoethyl (meth)acrylate; dimethylaminopropyl (meth)acrylamide; diethylaminopropyl (meth)acrylamide; dimethylaminoxypropyl (meth)acrylate; the quaternary salt of (meth)acrylamide, dimethylaminoethyl (meth)acrylate, diethylaminoethyl (meth)acrylate, dimethylaminopropyl (meth)acrylamide, diethylaminopropyl (meth)acrylamide and dimethylaminoxypropyl (meth)acrylate; alkyl esters derived from the reactions of alkanols having from 1 to about 16 carbon atoms with ethylenically unsaturated carboxylic acids; and hydroxy substituted derivatives of alkyl esters derived from the reactions of alkanols having from 1 to about 16 carbon atoms with ethylenically unsaturated carboxylic acids; and

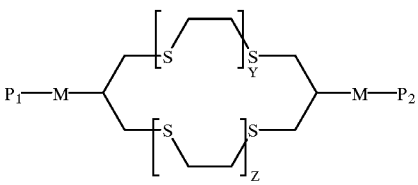

Formula 5 where Y is an integer of 1 to 7 and Z is an integer of 1 to 4 with the proviso that Y+Z cannot be greater than 8; M is independently O; S; COO where the carbon atom is attached to $P_1$ and $P_2$; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; and wherein $P_1$ and $P_2$ are independently polymerized ethylenically unsaturated monomers selected from the group consisting of hydroxypropyl acrylate, (meth)acrylamide; (meth)acrylic acid; dimethylaminoethyl (meth)acrylate; diethylaminoethyl (meth)acrylate; dimethylaminopropyl (meth)acrylamide; diethylaminopropyl (meth)acrylamide; dimethylaminopropyl (meth)acrylate; the quaternary salt of (meth)acrylamide, dimethylaminoethyl (meth)acrylate, diethylaminoethyl (meth)acrylate, dimethylaminopropyl (meth)acrylamide, diethylaminopropyl (meth)acrylamide and dimethylaminopropyl (meth)acrylate; alkyl esters derived from the reactions of alkanols having from 1 to about 16 carbon atoms with ethylenically unsaturated carboxylic acids; and hydroxy substituted derivatives of alkyl esters derived from the reactions of alkanols having from 1 to about 16 carbon atoms with ethylenically unsaturated carboxylic acids.

4. The method of claim 3 wherein the at least one polymeric thiacrown ether is thiacrownpolyacrylamide, thiacrownpolyacrylic acid or thiacrownpolyhydroxypropylacrylate.

5. The method of claim 1 wherein the at least one of thiacrown ether compound or polymeric thiacrown ether compound has a formula selected from the group consisting of:

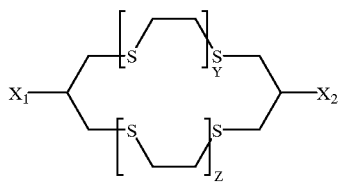

Formula 1 where Y is an integer of 1 to 7 and Z is an integer of 1 to 4 with the proviso that Y+Z cannot be greater than 8 and $P_1$ and $P_2$ are selected from the group consisting of H, polyalkyleneimines and oligomeric polyalkyleneamines;

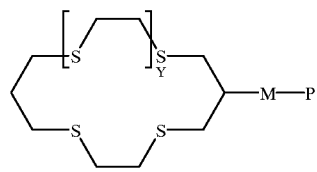

Formula 4 where Y is an integer of 1 to 7; wherein P is selected from the group consisting of polyalkyleneimines and oligomeric polyalkyleneamines and wherein M is O; COO where the carbon atom is attached to P; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; or M is S with the proviso that P cannot be polyethyleneimine; and

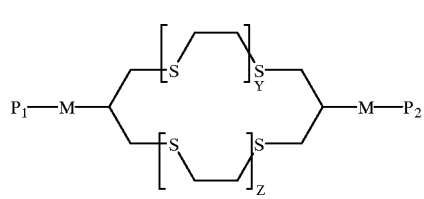

Formula 5 where Y is an integer of 1 to 7 and Z is an integer of 1 to 4 with the proviso that Y+Z cannot be greater than 8; $P_1$ and $P_2$ are selected from the group consisting of H, polyalkyleneimines and oligomeric polyalkyleneamines and wherein M is independently O; COO where the carbon atom is attached to $P_1$ and $P_2$; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; or M is S with the proviso that $P_1$ and $P_2$ cannot be polyethyleneimine.

6. The method of claim 5 wherein M is independently O; COO where the carbon atom is attached to P, $P_1$ and $P_2$; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl and said polyalkyleneimines is polyethyleneimine.

7. The method of claim 5 wherein said oligomeric polyalkyleneamines are selected from the group consisting of tetraethylenepentamine, triethylenetetramine, diethylenetriamine and diethylenetriaminepentaacetic acid.

8. The method of claim 1 wherein said aqueous alkanolamine solution contains dissolved acid gases.

9. The method of claim 1 wherein said effective corrosion inhibiting amount is from about 1 ppm to about 2500 ppm of said thiacrown compound in said aqueous alkanolamine solution.

10. An aqueous acid gas removal solution inhibited against acid gas promoted corrosion of metals comprising:
   a) alkanolamine;
   b) an effective corrosion inhibiting amount of at least one of thiacrown ether compound or polymeric thiacrown ether compound; and
   c) water, wherein the at least one of thiacrown ether compound or polymeric thiacrown ether compound is selected from one or more of the following formulas:

Formula 1

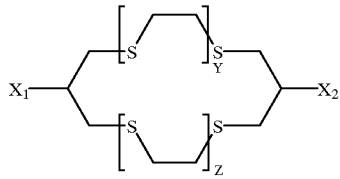

Formula 3

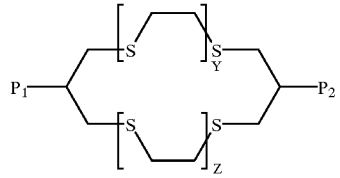

Formula 4

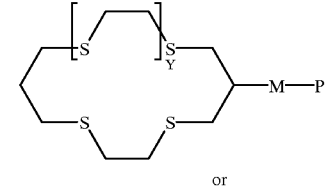

or

Formula 5

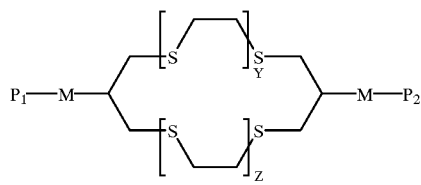

where Y is an integer of 1 to 7 and Z is an integer of 1 to 4 with the proviso that Y+Z cannot be greater than 8;

M is a linkage group and is selected from O; COO where the carbon atom is attached to P, $P_1$ and $P_2$; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; or M is S with the proviso that P, $P_1$ and $P_2$ are not polyethyleneimine;

P, $P_1$ and $P_2$ are polymers or oligomers in formulas 4 and 5;

$P_1$ and $P_2$ are selected from H, polymers, or oligomers in formula 3; and $X_1$ and $X_2$ are independently H; SH; F; Cl; I; substituted or unsubstituted $C_1$ to $C_{10}$ linear or branched alkyl or alkenyl group; substituted or unsubstituted $C_6$ to $C_{10}$ aryl; amine; mono- or di- $C_1$ to $C_{10}$ lower alkylamino; $C_1$ to $C_{10}$ lower alkanoylamino; nitro; cyano; COOH; $OCOR_1$ wherein $R_1$ is $C_1$ to $C_{10}$ alkyl or alkenyl group; $OR_2COOR_3$ wherein $R_2$ is substituted or unsubstituted $C_2$ to $C_5$ linear or branched alkyl group and $R_3$ is substituted or unsubstituted $C_1$ to $C_{10}$ linear or branched alkyl group or alkenyl group; $OR_4$ where $R_4$ is substituted or unsubstituted $C_1$ to $C_{10}$ linear or branched alkyl or alkenyl group; or $SR_5$ wherein $R_5$ is substituted or unsubstituted $C_1$ to $C_{10}$ linear or branched alkyl or alkenyl group; wherein the substituents of the $X_1$ and $X_2$ moieties are independently OH, SH, F, Br, Cl, I, COOH, amine, mono- or di- $C_1$ to $C_{10}$ alkylamino, alkanoylamino or nitro and with the proviso that both $X_1$ and $X_2$ cannot both be H.

11. The aqueous acid gas removal solution inhibited against acid gas promoted corrosion of metals of claim 10 wherein the at least one of thiacrown ether compound or polymeric thiacrown ether compound is a thiacrown ether compound having the formula:

Formula 1

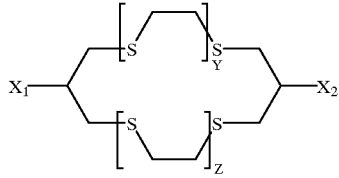

where Y is an integer of 1 to 7 and Z is an integer of 1 to 4 with the proviso that Y+Z cannot be greater than 8; $X_1$ and $X_2$ are independently H; SH; F; Cl; I; substituted or unsubstituted $C_1$ to $C_{10}$ linear or branched alkyl or alkenyl group; substituted or unsubstituted $C_6$ to $C_{10}$ aryl; amine; mono- or di- $C_1$ to $C_{10}$ lower alkylamino; $C_1$ to $C_{10}$ lower alkanoylamino; nitro; cyano; COOH; $OCOR_1$ wherein $R_1$ is $C_1$ to $C_{10}$ alkyl or alkenyl group; $OR_2COOR_3$ wherein $R_2$ is substituted or unsubstituted $C_2$ to $C_5$ linear or branched alkyl group and $R_3$ is substituted or unsubstituted $C_1$ to $C_{10}$ linear or branched alkyl group or alkenyl group; $OR_4$ where $R_4$ is substituted or unsubstituted $C_1$ to $C_{10}$ linear or branched alkyl or alkenyl group; or $SR_5$ wherein $R_5$ is substituted or unsubstituted $C_1$ to $C_{10}$ linear or branched alkyl or alkenyl group; wherein the substituents of the $X_1$ and $X_2$ moieties are independently OH, SH, F, Br, Cl, I, COOH, amine, mono- or di- $C_1$ to $C_{10}$ alkylamino, alkanoylamino or nitro and with the proviso that both $X_1$ and $X_2$ cannot both be H.

12. The aqueous acid gas removal solution inhibited against acid gas promoted corrosion of metals of claim 10 wherein the at least one of thiacrown ether compound or polymeric thiacrown ether compound has a formula selected from the group consisting of:

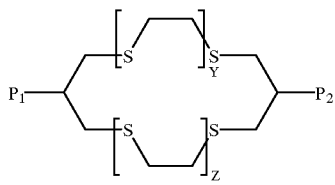

Formula 3 where Y is an integer of 1 to 7 and Z is an integer of 1 to 4 with the proviso that Y+Z cannot be greater than 8 and $P_1$ and $P_2$ are selected from the group consisting of H and polymerized ethylenically unsaturated monomers selected from the group consisting of hydroxypropyl acrylate; (meth) acrylamide; (meth)acrylic acid; dimethylaminoethyl (meth) acrylate; diethylaminoethyl (meth)acrylate; dimethylaminopropyl (meth)acrylamide; diethylaminopropyl (meth) acrylamide; dimethylaminopropyl (meth)acrylate; the quaternary salt of (meth)acrylamide, dimethylaminoethyl (meth)acrylate, diethylaminoethyl (meth)acrylate, dimethylaminopropyl (meth)acrylamide, diethylaminopropyl (meth) acrylamide and dimethylaminoxypropyl (meth)acrylate; alkyl esters derived from the reactions of alkanols having from 1 to about 16 carbon atoms with ethylenically unsaturated carboxylic acids; and hydroxy substituted derivatives of alkyl esters derived from the reactions of alkanols having from 1 to about 16 carbon atoms with ethylenically unsaturated carboxylic acids;

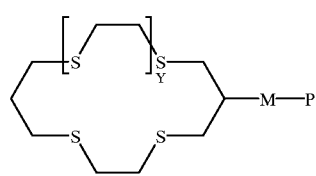

Formula 4 wherein Y is an integer of 1 to 7; wherein M is O; S; COO where the carbon atom is attached to P; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; and wherein P is a polymerized ethylenically unsaturated monomer selected from the group consisting of hydroxypropyl acrylate, (meth)acrylamide; (meth)acrylic acid; dimethylaminoethyl (meth)acrylate; diethylaminoethyl (meth) acrylate; dimethylaminopropyl (meth)acrylamide; diethylaminopropyl (meth)acrylamide; dimethylaminoxypropyl (meth)acrylate; the quaternary salt of (meth)acrylamide, dimethylaminoethyl (meth)acrylate, diethylaminoethyl (meth)acrylate, dimethylaminopropyl (meth)acrylamide, diethylaminopropyl (meth)acrylamide and dimethylaminoxypropyl (meth)acrylate; alkyl esters derived from the reactions of alkanols having from 1 to about 16 carbon atoms with ethylenically unsaturated carboxylic acids; and hydroxy substituted derivatives of alkyl esters derived from the reactions of alkanols having from 1 to about 16 carbon atoms with ethylenically unsaturated carboxylic acids; and

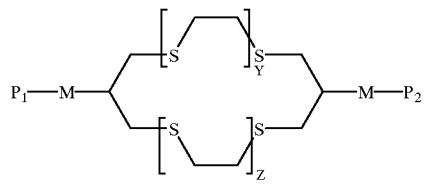

Formula 5 where Y is an integer of 1 to 7 and Z is an integer of 1 to 4 with the proviso that Y+Z cannot be greater than 8; M is independently O; S; COO where the carbon atom is attached to $P_1$ and $P_2$; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; and wherein $P_1$ and $P_2$ are independently polymerized ethylenically unsaturated monomers selected from the group consisting of hydroxypropyl acrylate, (meth)acrylamide; (meth)acrylic acid; dimethylaminoethyl (meth)acrylate; diethylaminoethyl (meth) acrylate; dimethylaminopropyl (meth)acrylamide; diethylaminopropyl (meth)acrylamide; dimethylaminopropyl (meth)acrylate; the quaternary salt of (meth)acrylamide, dimethylaminoethyl (meth)acrylate, diethylaminoethyl (meth)acrylate, dimethylaminopropyl (meth)acrylamide, diethylaminopropyl (meth)acrylamide and dimethylaminopropyl (meth)acrylate; alkyl esters derived from the reactions of alkanols having from 1 to about 16 carbon atoms with ethylenically unsaturated carboxylic acids; and hydroxy substituted derivatives of alkyl esters derived from the reactions of alkanols having from 1 to about 16 carbon atoms with ethylenically unsaturated carboxylic acids.

13. The aqueous acid gas removal solution inhibited against acid gas promoted corrosion of metals of claim 12 wherein the at least one polymeric thiacrown ether compound is thiacrownpolyacrylamide, thiacrownpolyacrylic acid or thiacrownpolyhydroxypropylacrylate.

14. The aqueous acid gas removal solution inhibited against acid gas promoted corrosion of metals of claim 10 wherein the at least one of thiacrown ether compound or polymeric thiacrown ether compound has a formula selected from the group consisting of:

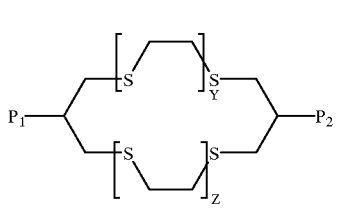

Formula 3 where Y is an integer of 1 to 7 and Z is an integer of 1 to 4 with the proviso that Y+Z cannot be greater than 8 and $P_1$ and $P_2$ are selected from the group consisting of H, polyalkyleneimines and oligomeric polyalkyleneamines;

Formula 4

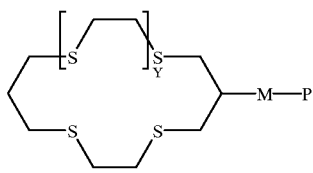

where Y is an integer of 1 to 7; wherein P is selected from the group consisting of polyalkyleneimines and oligomeric polyalkyleneamines and wherein M is O; COO where the carbon atom is attached to P; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; or M is S with the proviso that P cannot be polyethyleneimine; and Formula 5

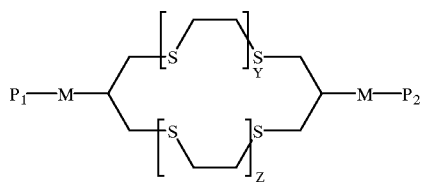

where Y is an integer of 1 to 7 and Z is an integer of 1 to 4 with the proviso that Y+Z cannot be greater than 8; $P_1$ and $P_2$ are selected from the group consisting of H, polyalkyleneimines and oligomeric polyalkyleneamines and wherein M is independently O; COO where the carbon atom is attached to $P_1$ and $P_2$; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl; or M is S with the proviso that $P_1$ and $P_2$ cannot be polyethyleneimine.

15. The aqueous acid gas removal solution inhibited against acid gas promoted corrosion of metals of claim 14 wherein M is independently O; COO where the carbon atom is attached to P, $P_1$ and $P_2$; $C_1$ to $C_5$ substituted or unsubstituted linear or branched alkylene wherein the substituent is OH, SH, F, Br, Cl, I, COOH, amine, mono- or di- $C_1$ to $C_5$ alkylamino, $C_1$ to $C_3$ lower alkanoylamino or nitro; or M is $NR_6$ where $R_6$ is H or $C_1$ to $C_5$ alkyl and said polyalkyleneimine is polyethyleneimine.

16. The aqueous acid gas removal solution inhibited against acid gas promoted corrosion of metals of claim 14 wherein said oligomeric polyalkyleneamines are selected from tetraethylenepentamine, triethylenetetramine, diethylenetriamine or diethylenetriaminepentaacetic acid.

17. The aqueous acid gas removal solution inhibited against acid gas promoted corrosion of metals of claim 10 wherein said solution comprises about 15 to 75 weight percent alkanolamine, less than about 1 weight percent thiacrown compound and from about 25 to 85 weight percent water with the proviso that the combined weight percentaes equal 100 weight percent.

* * * * *